United States Patent
Hammerschmied et al.

(10) Patent No.: US 11,005,144 B2
(45) Date of Patent: May 11, 2021

(54) BATTERY SYSTEM WITH A CELL CONNECTING UNIT

(71) Applicant: Samsung SDI Co., Ltd., Yongin-si (KR)

(72) Inventors: Helmut Hammerschmied, Graz (AT); Peter Apolloner, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 200 days.

(21) Appl. No.: 16/345,162

(22) PCT Filed: Oct. 26, 2017

(86) PCT No.: PCT/KR2017/011931
§ 371 (c)(1),
(2) Date: Apr. 25, 2019

(87) PCT Pub. No.: WO2018/128256
PCT Pub. Date: Jul. 12, 2018

(65) Prior Publication Data
US 2019/0288262 A1    Sep. 19, 2019

(30) Foreign Application Priority Data
Jan. 6, 2017  (EP) ...................... 17150508

(51) Int. Cl.
*H01M 50/502* (2021.01)
*H01M 10/42* (2006.01)
(Continued)

(52) U.S. Cl.
CPC ....... *H01M 50/502* (2021.01); *H01M 10/052* (2013.01); *H01M 10/425* (2013.01);
(Continued)

(58) Field of Classification Search
CPC ....... H01M 10/425; H01M 2010/4271; H01M 50/502; H01M 50/503–569
(Continued)

(56) References Cited

U.S. PATENT DOCUMENTS

2009/0297892 A1    12/2009  Ijaz et al.
2014/0120393 A1    5/2014   Desbois-Renaudin et al.
(Continued)

FOREIGN PATENT DOCUMENTS

JP    2014-520365 A    8/2014
JP    2015-22965 A     2/2015
(Continued)

OTHER PUBLICATIONS

Extended European Search Report for corresponding European Patent Application No. 17 150 508.4, dated Mar. 30, 2017, 8pp.
(Continued)

*Primary Examiner* — James M Erwin
(74) *Attorney, Agent, or Firm* — Lewis Roca Rothgerber Christie LLP (57) ABSTRACT

The present invention refers to a battery system (300) which comprises a cell stack (20), wherein at least two battery cells (10) of the cell stack (20) are electrically interconnected via a battery cell connector (90). The battery system (30)
(Continued)

comprises a printed circuit board, PCB (150), and a cell connecting unit, CCU (140). The battery cell connector (90) is accommodated in the CCU (140), the CCU (140) being fixed onto the cell stack (20) and comprising one first flexible bracket (145) that is inserted into a corresponding mounting hole (151) of the PCB (150). According to the invention, the first flexible bracket (145) of the CCU (140) comprises a member (146) configured to fix the PCB (150) to the CCU (140) after the member (146) has been molten in a state in which the first flexible bracket (145) was inserted into the corresponding mounting hole (151).

15 Claims, 2 Drawing Sheets (51) Int. Cl.
*H01M 10/052* (2010.01)
*H01M 50/20* (2021.01)

(52) U.S. Cl.
CPC .... *H01M 50/20* (2021.01); *H01M 2010/4271* (2013.01); *Y02T 10/70* (2013.01)

(58) Field of Classification Search
USPC .............................................................. 429/7
See application file for complete search history.

(56) References Cited

U.S. PATENT DOCUMENTS

| | | |
|---|---|---|
| 2014/0285987 A1 | 9/2014 | Nagashima et al. |
| 2014/0335385 A1 | 11/2014 | Ikeya et al. |
| 2015/0162592 A1 | 6/2015 | Cho et al. |
| 2016/0254515 A1 | 9/2016 | Shimoda et al. |
| 2017/0005384 A1 | 1/2017 | Harris et al. |

FOREIGN PATENT DOCUMENTS

| | | |
|---|---|---|
| KR | 10-2009-0096962 A | 9/2009 |
| KR | 10-2014-0115927 A | 10/2014 |
| KR | 10-2014-0130357 A | 11/2014 |
| KR | 10-2015-0066960 A | 6/2015 |
| WO | WO 2015/046635 A1 | 4/2015 |

OTHER PUBLICATIONS

European Office action for corresponding European Patent Application No. 17 150 508.4, dated Mar. 2, 2018, 5pp.

BATTERY SYSTEM WITH A CELL CONNECTING UNIT

CROSS-REFERENCE TO RELATED APPLICATION(S)

This application is a National Phase Patent Application of International Patent Application Number PCT/KR2017/011931, filed on Oct. 26, 2017, which claims priority of European Patent Application No. 17150508.4, filed Jan. 6, 2017. The entire contents of all of which are incorporated herein by reference.

TECHNICAL FIELD

The present invention relates to a battery system comprising a cell stack, the cell stack comprising a plurality of battery cells, wherein at least two battery cells of the cell stack are electrically interconnected via a battery cell connector. Moreover, the battery system comprises a battery management system, BMS, which comprises a printed circuit board, PCB. Furthermore, the battery system comprises a cell connecting unit, CCU, wherein the battery cell connector is accommodated in the CCU, the CCU being fixed onto the cell stack and comprising at least one first flexible bracket that is inserted into a corresponding mounting hole of the PCB.

BACKGROUND ART

A rechargeable or secondary battery system differs from a primary battery system in that it can be repeatedly charged and discharged, while the latter provides only an irreversible conversion of chemical to electrical energy. Low-capacity rechargeable battery systems are used as power supply for small electronic devices, such as cellular phones, notebook computers and camcorders, while high-capacity rechargeable battery systems are used as the power supply for hybrid vehicles and the like.

In general, rechargeable battery systems, as e.g. battery modules, include a plurality of battery cells which are often stacked to form a so called cell stack or battery cell stack. The battery cells of such cell stacks include an electrode assembly respectively, each electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose. The single battery cells of the battery cell stack are electrically interconnected via battery cell connectors respectively, wherein—also depending on the battery's intended purpose—the battery cells can be connected in series and/or in parallel with each other via the battery cell connectors.

Furthermore, most battery systems comprise a battery management system, BMS, which is positioned next to or at least close to the battery cell stack and adapted to perform various functions with regard to the battery cells, as e.g. cell voltage measurements or a balancing of the state of charge, SOC, of the different battery cells of the battery cell stack. In order to be able to perform these functions, most battery management systems comprise a plurality of chipsets, sensors and/or other components which are often at least in part realized on a printed circuit board, PCB. Especially for the aforementioned cell voltage measurement and cell balancing, the BMS needs to be connected to the battery cell connectors.

As battery cells of the state of the art deform, especially swell, when charged and/or discharged, the PCB of the BMS cannot be directly mounted to the battery cell stack, because the fixation means chosen to fix the PCB to the battery cell stack would burst or rupture upon a deformation of the battery cell stack beyond a certain limit. For this reason, a wiring harness is necessary to connect the PCB of the BMS to the battery cell connectors. However, such a wiring harness increases the total costs and complexity of a battery system, is impractical to mount and requires the battery system to be larger than necessary. Expressed in other words, the battery management system, BMS, is positioned next to the battery cell stack. Among others for a cell voltage measuring and for a cell balancing, each battery cell connector needs to be connected to the BMS through a wiring harness. The wiring harness is necessary, as it is not possible to mount the PCB directly at the cell stack because of the swelling of the battery cell stack during its use.

DISCLOSURE OF INVENTION

Technical Problem

It is thus an object of the present invention to provide for a cost-efficient and less complex battery system that can easily be manufactured.

Solution to Problem

One or more of the drawbacks of the prior art could be avoided or at least reduced by means of the present invention. In particular, it is provided a battery system which comprises a cell stack, comprising a plurality of battery cells, wherein at least two battery cells of the cell stack are electrically interconnected via a battery cell connector. The battery system further comprises a battery management system, BMS, comprising a printed circuit board, PCB, and a cell connecting unit, CCU. The battery cell connector is accommodated in the CCU, the CCU being fixed onto the cell stack and comprising at least one first flexible bracket that is inserted into a corresponding mounting hole of the PCB. According to the invention, the first flexible bracket of the CCU comprises a member configured to fix the PCB to the CCU after the member has been molten in a state in which the first flexible bracket was inserted into the corresponding mounting hole.

Such a battery system can easily be manufactured, as e.g. a wiring harness does not come to use and as the PCB of the BMS of the battery system can easily and quickly be connected and fixed to the cell stack via the CCU. Expressed in other words, it is provided a battery system with a CCU that allows for the PCB of the battery management system and the battery cell connectors to be integrated therein. Via the first flexible bracket, the CCU can easily be connected and fixed to the battery cell stack.

Preferably, the member is arranged on a tip portion of the first flexible bracket, wherein the first flexible bracket with the member at the tip is configured to be inserted into the mounting hole and to be fed through the mounting hole. Expressed in other words, the first flexible bracket pierces through the PCB via the mounting hole, so that the member at the tip of the first flexible bracket—when fully inserted— is arranged such that it at least in part protrudes from the surface of the PCB on the other side of the PCB. The first flexible bracket is configured to fix the PCB to the CCU when the member of the first flexible bracket is molten in this state.

Preferably, the CCU is screwed to the cell stack. Preferably, the CCU represents a support structure adapted to support a plurality of components of the battery system.

Preferably, the battery cell connector is realized as a bus bar that is molded into the CCU. Preferably, all battery cell connectors of the battery system are realized as bus bars respectively, the bus bars being molded into the CCU. In such an embodiment, the bus bars are safely integrated into the CCU so that the CCU can easily and quickly be mounted onto the battery cell stack with the CCU integrated therein. Furthermore, in such an embodiment, the battery system can advantageously be provided in a small dimension, as the battery cell connectors are fully integrated within the CCU, preferably within a plate shaped portion of the CCU.

In a preferred embodiment, the member of the first flexible bracket is adapted to be molten via a hot staking procedure. A hot staking procedure or a hot staking process is a quick, flexible and reliable process allowing for an efficient melting of meltable components. It can be used to melt a large variety of different materials, for example plastics.

Preferably, the member of the first flexible bracket is a hot staking dome, adapted to fix the PCB at the CCU when melted. Such hot staking domes easily and quickly can be molten and thereby be transformed into a structure serving as a retaining lug.

Preferably, the CCU comprises an elastic material which is adapted to reversibly deform, allowing for the CCU to reversibly adjust to a deformation of the cell stack that is due to a charging or a discharging of at least one battery cell of the cell stack. Furthermore preferred, the CCU consists of an elastic material which is adapted to reversibly deform, allowing for the CCU to reversibly adjust to a deformation of the cell stack that is due to a charging or a discharging of at least one battery cell of the cell stack. In such embodiments, the CCU does not burst or rupture when the battery cell stack swells, expands or deforms. Preferably, the elastic material is a thermoplastic material or an elastomer. In such an embodiment, a wiring harness can be omitted as among others the increased elasticity of the CCU allows for the PCB to be directly mounted onto the battery cell stack via the CCU. The material of the CCU is flexible enough to expand in case of a swelling of the battery cell stack.

In a preferred embodiment, the first flexible bracket comprises an elastic material which is adapted to reversibly deform, allowing for the first flexible bracket to reversibly compensate for an arising change in the position of the PCB relative to the CCU due to a reversible deformation of the CCU. In such a preferred embodiment, the first flexible bracket is realized as a mounting bracket and at the same time as a length compensating bracket, designed and adapted to balance a swelling expansion between the CCU and the PCB. In such an embodiment, both the PCB and the CCU preferably are substantially plate shaped, having a substantially rectangular circumference with two opposing long edges and two opposing short edges respectively. Preferably, the PCB is fixed to the CCU via the first flexible bracket such that the two opposing short edges of the PCB are arranged in parallel to the two opposing short edges of the CCU. Moreover preferred, in such an embodiment, the two opposing long edges of the PCB are arranged in parallel to the two opposing long edges of the CCU, when the PCB and the CCU are fixed together.

Furthermore preferred, the battery cell stack comprises a plurality of flat, substantially plate and/or cuboid shaped battery cells with two opposing side surfaces respectively, wherein the side surfaces of the battery cells are the larges surfaces of the battery cells respectively. In a preferred embodiment, the battery cells are stacked along a direction which is perpendicular to the side surfaces of the battery cells, so that within the battery cell stack, the side surfaces of a first battery cell are arranged in parallel to the side surfaces of a second battery cell, of a third battery cell and so on. Preferably, the battery cell stack substantially has a cuboid shape. In such an embodiment, the battery cell stack swells most in a direction which is parallel to the stacking direction of the battery cell stack and thus to the direction in which the battery cells are stacked when the battery cells of the battery cell stack are charged or discharged. This is due to the fact that the flat side surfaces of the battery cells expand outwardly when charged and inwardly when discharged.

Moreover, in such an embodiment, the PCB and the CCU preferably are fixed to the cell stack having a longitudinal orientation, meaning that the two opposing long edges of the PCB and of the CCU are arranged in parallel to the stacking direction of the battery cell stack respectively. Expressed in other words, the PCB and the CCU preferably are fixed to the cell stack having a longitudinal orientation, meaning that the two opposing short edges of the PCB and of the CCU are arranged in parallel to the side surfaces of the battery cells of the battery cell stack. In such an embodiment, the battery cell stack swells, expands and/or deforms primarily in a direction which is parallel to the two opposing long edges of the PCB and of the CCU respectively. Thus, the CCU comprising the aforementioned flexible material also reversibly swells, expands and/or deforms, when the battery cell stack swells, expands and/or deforms. In such a preferred embodiment, a difference in or a change in the difference of the length and/or the position of the CCU and of the PCB, occurring due to a swelling of the battery cell stack, is compensated by the first flexible bracket being realized as a mounting bracket on the one hand and as a length compensating bracket on the other hand.

Expressed in other words, if—in an unexpanded state of the cell stack—the length of the CCU is equal to $L_{CCU}$ and if the length of the PCB is equal to $L_{PCB}$, the difference in the length of the CCU and of the PCB is equal to $\Delta L = |L_{CCU} - L_{PCB}|$. A change in this difference is equal to $\Delta(\Delta L) = \Delta(|L_{CCU} - L_{PCB}|)$ and may arise due to a swelling or an expansion of the battery cell stack. The first flexible bracket is preferably adapted to compensate for an eventually arising change in the difference of the length of the CCU and of the PCB $\Delta(\Delta L)$.

This means that the first flexible bracket is optimized and configured for a compensation of an arising, swelling induced difference in or a change in the difference of the length of the CCU and of the PCB in a direction which is parallel to the two opposing long edges of the CCU and the PCB. Preferably, the first flexible bracket being realized as a length-compensating bracket has a form factor which is more rigid in a direction that is parallel to the two opposing short edges of the CCU and the PCB than in a direction that is parallel to the two opposing long edges of the CCU and the PCB, in which the first flexible bracket is thus more elastic. Expressed in other words, in such an embodiment, the first flexible bracket being realized as a length compensating bracket is adapted and optimized to compensate for a deformation of the CCU in a direction which is parallel to a primary swelling direction of the battery cell stack, the primary swelling direction being a direction in which the battery cell stack swells the most during a charging and discharging of the battery cells of the battery cell stack.

Preferably, the CCU has a substantially plate shaped body portion, wherein the first flexible bracket comprises a base part and wherein the member protrudes from the base part. In such an embodiment, the battery system can be realized as a compact device, as the CCU can be fixed, especially screwed tightly onto the battery cell stack.

In a preferred embodiment, the base part has the shape of a cuboid, wherein at least one edge of the cuboid extends into a direction which is perpendicular to the substantially plate shaped body portion of the CCU and wherein the member has the shape of a cylinder which protrudes from the base part into a direction that is parallel to the at least one edge of the cuboid, forming a prolongation of the cuboid shaped base part. In such an embodiment, the ability of the first flexible bracket to compensate for a deformation of the CCU is not only supported by the usage of the elastic material and by the mentioned configuration of the first flexible bracket regarding the differing form factors, but also by the geometry of the first flexible bracket. The cuboid shaped base part of the first flexible bracket is stiff and rigid in a direction which is parallel to the long edges of the cuboid shaped base part and more flexible and elastic in a direction which is parallel to the short edges of the cuboid shaped base part. In such an embodiment, the longer edges of the cuboid shaped base part are preferably perpendicular to the primary swelling direction of the cell stack and parallel to the substantially plate shaped body portion of the CCU. Furthermore, the shorter edges of the cuboid shaped base part are preferably parallel to the primary swelling direction of the cell stack.

As the cylinder shaped meltable member forms a prolongation of the cuboid shaped base part and thus a tip of the first flexible bracket, it can easily be fed through the mounting hole of the PCB and melted in order to attach the PCB to the CCU.

Preferably, the cell stack has a primary direction of deformation along which it deforms most during a charge and/or a discharge of at least one of the battery cells of the cell stack, wherein the stiffness of the first flexible bracket is smallest in a direction which is parallel to the primary direction of deformation. The stiffness of the first flexible bracket being smallest in a direction that is parallel to the primary direction of deformation of the battery cell stack causes the first flexible bracket to be most flexible in this primary direction of deformation.

In a preferred embodiment, the base part of the first flexible bracket has two opposing first quadrilateral faces and two opposing second quadrilateral faces, wherein the first and second quadrilateral faces are arranged substantially perpendicularly to the substantially plate shaped body portion of the CCU, and wherein the first quadrilateral faces each have an area that is larger than the area of one of the second quadrilateral faces respectively, the second quadrilateral faces extending along a direction that is parallel to the primary direction of deformation of the cell stack. In such an embodiment of the battery system according to the invention, the narrow side surfaces and the short edges of the cuboid shaped first flexible bracket are aligned with the primary direction of deformation of the battery cell stack. In such an embodiment, also the geometry of the first flexible bracket contributes to its ability to compensate for an expansion of the battery cell stack. It is in particular this flexibility that allows to fix the PCB to the battery cell stack via the CCU, thus allowing for an omittance of a wiring harness.

Preferably, the PCB comprises at least one bonding pad, wherein the CCU comprises a second bracket, adapted to physically support the bonding pad. In such an embodiment, the bonding pads can be bonded directly from the BMS, or in other words, from the PCB to the battery cell connectors or to a bonding support of the battery cell connectors, as the bonding pads are supported by the second bracket during the bonding process. Preferably, also the second bracket is a flexible bracket, and thus a second flexible bracket. Preferably, the second bracket comprises an elastic material. Furthermore preferred, the elastic material is realized as a plastic. Furthermore preferred, the second bracket represents a support structure for the bonding pad of the PCB. It is thus preferably provided a CCU design allowing to mount the BMS at the battery cell stack and to use the bonding process directly from the BMS to the cell connectors by supporting the bonding pads with a plastic supporting geometry and a mounting geometry with an integrated length balancing feature. In such an embodiment, the manufacturing of the battery system is eased.

In a furthermore preferred embodiment, in a fully assembled state of the battery system, a first surface of the PCB faces towards the CCU and a second surface of the PCB faces away from the CCU, wherein the bonding pad is arranged on the second surface of the PCB and wherein the second bracket extends from the CCU towards an area of the first surface directly opposing the bonding pad. In such an embodiment, the bonding pad is stably supported by the second bracket directly from the opposite side of the PCB, such that a counterforce is applied to the PCB as soon as a force is supplied to the bonding pad during the bonding process.

Preferably, in a fully assembled state of the battery system, the second bracket contacts the PCB to support the bonding pad. In such an embodiment, the support of the bonding pad is stronger than in an embodiment in which the second bracket does not contact the PCB.

In a preferred embodiment, the first flexible bracket and the second bracket are positioned next to each other. In such an embodiment, the bonding pad is strongly supported. Expressed in other words, in such an embodiment, the area of the bonding pad is very strongly supported for the bonding process, as the bonding pad is supported by an additional, first flexible bracket and a mounting bracket next to it to avoid a gap between the PCB and the supporting bracket. Furthermore, the first flexible bracket being positioned next to the second bracket prevents the PCB from deforming when applying a force onto the bonding pad during the bonding process.

Preferably, the second bracket has the shape of a cuboid, wherein one surface of the cuboid at least in part is in contact with the PCB. In such an embodiment, the bonding pad is supported across a large area. Preferably, this area has a size which equals the size of the area of the bonding pad itself. In other embodiments, the mentioned contact area preferably has a size which is greater or smaller than the size of the area of the bonding pad.

In a preferred embodiment, the second bracket has two opposing first quadrilateral faces and two opposing second quadrilateral faces, wherein the first and second quadrilateral faces are arranged substantially perpendicularly to the substantially plate shaped body portion of the CCU, and wherein the first quadrilateral faces each have a surface area that is larger than the surface area of one of the second quadrilateral faces respectively, wherein the first quadrilateral faces of the second bracket extend in a plane that is parallel to the second quadrilateral faces of the first flexible bracket respectively. In such an embodiment, the second bracket interacts well with the first flexible bracket, as the second bracket supports the structure formed of CCU and PCB while the first flexible bracket allows for an adjustment regarding an arising difference in or a change in the difference of the length and/or the relative position of CCU and PCB.

Preferably, the BMS and/or the PCB comprises circuitry for a measurement of the voltage of at least one battery cell of the battery cell stack and/or for a balancing of the battery cells of the battery cell stack.

Further aspects of the present invention could be learned from the dependent claims or the following description.

Advantageous Effects of Invention

An exemplary embodiment of the present invention may provide for a cost-efficient and less complex battery system that can easily be manufactured.

BRIEF DESCRIPTION OF DRAWINGS

Features will become apparent to those of ordinary skill in the art by describing in detail exemplary embodiments with reference to the attached drawings in which.

BEST MODE FOR CARRYING OUT THE INVENTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a region or an element is referred to as being "above" or "on" another region or element, it can be directly on the other region or element, or intervening regions or elements may also be present.

Features of the inventive concept and methods of accomplishing the same may be understood more readily by reference to the following detailed description of embodiments and the accompanying drawings. The present invention, however, may be embodied in various different forms, and should not be construed as being limited to only the illustrated embodiment herein. Rather, this embodiment is provided as example so that this disclosure will be thorough and complete, and will fully convey the aspects and features of the present invention to those skilled in the art.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element is referred to as being "on," "connected to," or "coupled to" another element, it can be directly on, connected to, or coupled to the other element, or one or more intervening elements may be present. In addition, it will also be understood that when an element is referred to as being "between" two elements, it can be the only element between the two elements, or one or more intervening elements may also be present.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value. Further, the use of "may" when describing embodiments of the present invention refers to "one or more embodiments of the present invention.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
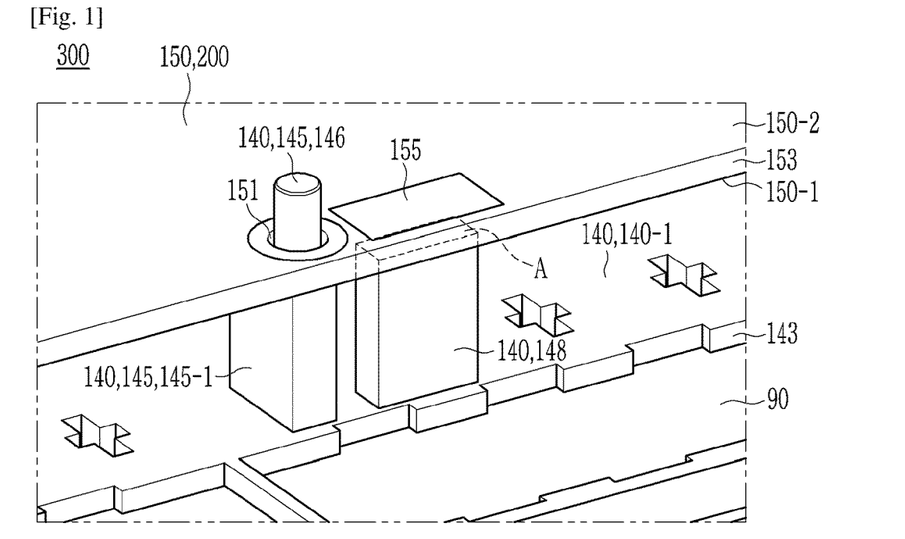
FIG. 1 illustrates a schematic perspective view of a detail of a battery system that is according to an embodiment of the invention.

FIG. 1 illustrates a schematic perspective view of a detail of a battery system 300 that is according to an embodiment of the invention. The battery system 300 shown in FIG. 1 comprises a battery cell stack with a plurality of battery cells, wherein neither the battery cell stack, nor the battery cells of the same are shown in FIG. 1 for the sake of a better understanding.

In this embodiment, the battery cells of the battery cell stack have a flat, substantially plate and/or cuboid shaped body with two opposing side surfaces respectively, wherein the side surfaces of the battery cells are larger than the other surfaces of the cells respectively. The battery cells are stacked along a direction which is perpendicular to the side surfaces of the battery cells, so that within the battery cell stack, the side surfaces of a first battery cell are arranged in parallel to the side surfaces of a second battery cell, of a third battery cell and so on, providing the battery cell stack with a substantially cuboid shape. However, other embodiments can be realized in which the battery cell stack and the cells can have a fundamentally different shape. In this embodiment, the battery cells of the battery cell stack of the battery system 300 are electrically connected with each other via battery cell connectors 90. The battery cell connectors 90 (or bus bar) electrically interconnect a terminal of a battery cell with a terminal of another battery cell or with another a terminal of the battery system 300 respectively.

Furthermore, the battery system 300 comprises a battery management system, BMS 200, which comprises a printed circuit board, PCB 150, of which only a fraction is shown in FIG. 1. The BMS 200 comprises a plurality of components, as e.g. a processing unit, different sensors, memory units and the like and is adapted to fulfill a plurality of different functions. For example, in this embodiment, the BMS 200 is adapted to measure the voltages of the battery cells respectively and is adapted to balance the states of charge of the battery cells respectively. In this embodiment, a large quantity of the components of the BMS 200 are realized on the PCB 150. The PCB 150 mechanically supports and electrically connects the electronic components of the BMS 200, using conductive tracks, pads and other features etched from—in this exemplary embodiment—copper sheets laminated onto a non-conductive substrate. In this embodiment, the mentioned components, as e.g. capacitors, resistors or further active devices are soldered on the PCB 150. However, any other PCB 150 can come to use in an embodiment of a battery system 300 that is according to the invention.

The battery system 300 further comprises a cell connecting unit, CCU 140, being fixed onto the battery cell stack. In this embodiment, the CCU 140 is exemplarily screwed onto the battery cell stack, which is thus not visible when viewing FIG. 1, as it is positioned directly under the CCU 140. However, the CCU 140 can also be connected to the battery cell stack using any other means or procedure. In this embodiment, the CCU 140 exemplarily comprises an elastic material which is adapted to deform, allowing for the CCU 140 to expand together with the battery cell stack which expands or swells due to a charging or a discharging of the battery cells of the cell stack, which will be explained further hereinafter. In this embodiment, the elastic material of the CCU 140 exemplarily is Polypropylen. However, also any other material can come to use to realize the CCU 140 or parts thereof.

In this embodiment, the CCU 140 comprises a plate shaped body portion 140-1 being in contact to a surface of the cuboid shaped battery cell stack (not visible). The battery cell connectors 90 electrically interconnecting the battery cells of the battery cell stack in this embodiment are exemplarily molded into the CCU 140, in more detail, into the plate shaped body portion 140-1 of the CCU 140. Thus, the battery cell connectors 90 are integrated into the CCU 140 and in this embodiment are exemplarily in part covered by the same. The battery cell connectors 90 are accessible from the surface of the CCU 140 which faces the PCB 150 via cross-shaped cut-outs within the plate shaped body portion 140-1 of the CCU 140. In this embodiment, the plate shaped body portion 140-1 of the CCU 140 is arranged in parallel to the substantially plate shaped PCB 150.

Moreover, the CCU 140 comprises a plurality of first flexible brackets 145 and a plurality of second brackets 148, wherein only one first flexible bracket 145 and one second bracket 148 is shown in FIG. 1. The following description will only refer to the aforementioned first and second brackets 145, 148 visible in FIG. 1. However, also all the other first and second brackets 145, 148 of the CCU 140 of the battery system 300 shown in FIG. 1 are configured accordingly.

In this first embodiment, the first flexible bracket 145 and the second bracket 148 both comprise the aforementioned elastic material, such that they represent flexible components or flexible brackets that can be reversibly deformed. The first flexible bracket 145 and the second bracket 148 are arranged perpendicularly with respect to the surface of the plate shaped body portion 140-1 of the CCU 140. The first flexible bracket 145 has an exemplarily cuboid shaped base part 145-1 and a meltable member 146 which has the shape of a cylinder, which protrudes from the base part 145-1 of the first flexible bracket 145 and which serves as a hot staking dome. The meltable member 146 is inserted into and fed through a corresponding mounting hole 151 arranged within the PCB 150. When the meltable member 146 (the hot staking dome) is molten, it fixes the PCB 150 to the CCU 140, as a cross-section of the member 146 increases, thus hindering the first flexible bracket 145 from being extracted from the mounting hole 151 again.

As mentioned before, both the PCB 150 and the CCU 140 are substantially plate shaped, each having a substantially rectangular circumference with two opposing long edges 143, 153 and two opposing short edges. The beholder of FIG. 1 is directly looking onto one of the long edges 143, 153 of the CCU 140 and of the PCB 150 respectively, while the corresponding other ones of the long edges are not visible. As can be seen in FIG. 1, the PCB 150 is fixed to the CCU 140 via the first flexible bracket 146, such that the two opposing long edges 153 of the PCB 150 are arranged in parallel to the two opposing long edges 143 of the CCU 140. In this embodiment, the long edges 143, 153 of the CCU 140 and of the PCB 150 are further arranged in parallel to a primary direction of deformation of the battery cell stack, in which the cell stack deforms, expands and/or swells the most during use of the same. For this reason, the first flexible bracket 145 is configured such that it allows for a compensation of an arising difference in or a change in the difference of the length and position of the CCU 140 and of the PCB 150. In more detail, the base part 145-1 of the first flexible bracket 145 has two opposing first quadrilateral faces and two opposing second quadrilateral faces, wherein the first and second quadrilateral faces are arranged substantially perpendicularly to the substantially plate shaped body portion 140-1 of the CCU 140. The first quadrilateral faces each have an area that is larger than the area of one of the second quadrilateral faces respectively, the second quadrilateral faces extending along a direction that is parallel to the primary direction of deformation of the cell stack and thus parallel to the long edges 143, 153 of the CCU 140 and of the PCB 150 respectively.

Due to the material, the geometry and the orientation of the first flexible bracket 145, the first flexible bracket 145 optimally allows to reversibly compensate for an arising change in the position and length of the CCU 140 relative to the PCB 150 due to a reversible deformation of the CCU 140, which will be described in further detail with respect to FIG. 2.

In this embodiment, also the second bracket 148 is cuboid shaped and has two opposing first quadrilateral faces and two opposing second quadrilateral faces, wherein the first and second quadrilateral faces are arranged substantially perpendicularly to the plate shaped body portion 140-1 of the CCU 140, and wherein the first quadrilateral faces each have a surface area that is larger than the surface area of one of the second quadrilateral faces respectively. The first quadrilateral faces of the second bracket 148 extend in a plane that is parallel to the second quadrilateral faces of the first flexible bracket 145 respectively. Thus, the first quadrilateral faces of the second bracket 148 extend in a plane that is parallel to the long edges 143, 153 of the CCU 140 and of the PCB 150 respectively. Expressed in other words, the first quadrilateral faces of the second bracket 148 extend in a plane that is parallel to the primary direction of deformation of the battery cell stack.

The second bracket 148 is adapted to physically support a bonding pad 155 which is arranged on a second surface 150-2 of the PCB 150. In this embodiment, the second surface 150-2 of the PCB 150 is pointing away from the plate shaped body portion 140-1 of the CCU 140, while a first surface 150-1 of the PCB 150 is pointing towards the plate shaped body portion 140-1 of the CCU 140. In order to physically support the bonding pad 155, a surface of the cuboid shaped second bracket 148 is in contact with an area A of the first surface 150-1 of the PCB 150, wherein the area A is an area on the opposite side of the PCB 150 corresponding to the location of the bonding pad 155. Expressed in other words, the second bracket 148 extends from the CCU 140 towards an area A of the first surface 150-1 of the PCB 150 directly opposing the bonding pad 155. This allows for the bonding pad 155 to be bonded directly from the PCB 150 to the battery cell connectors 90. In this embodiment, the battery cell connectors 90 are electrically connected (not shown) to a bonding support, which also forms a part of the battery cell connectors 90 and which can easily be bonded to the bonding pad 155 via bonding wires (not shown), as the bonding pads 155 are physically supported by the second brackets 148. Since the bonding pads 155 of the PCB 150 are physically supported by the second brackets 148, the PCB 150 will not deform when the bonding process is performed and when a pressure/force is supplied to the bonding pads 155 respectively.

Figure 2:
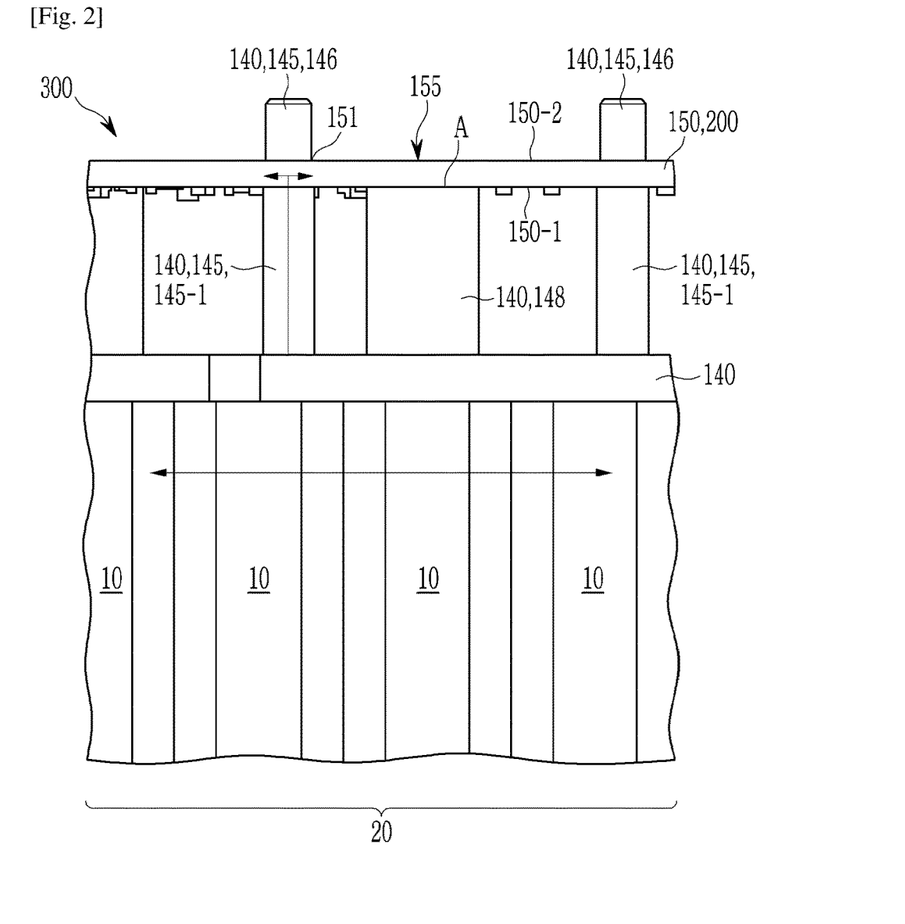
FIG. 2 illustrates a schematic cross section of a part of the battery system of which a detail is shown in FIG. 1.

In FIG. 2, it is illustrated a schematic cross section of a part of the battery system 300 of which a detail is shown in FIG. 1, wherein the cross section shown in FIG. 2 further shows a neighboring first flexible bracket 145 and some of the battery cells 10 of the battery cell stack 20. Expressed in other words, in FIG. 2, some of the stacked battery cells 10 of the battery cell stack 20 are shown, the battery cells 10 being stacked as mentioned above, with their flat side surfaces being in contact with one another. The flat side surfaces of the battery cells 10 extend across planes perpendicular to the stacking direction.

In the following, the functionality of the CCU 140 and especially of the first flexible brackets 145 will be explained with respect to FIG. 2.

The battery cell stack 20 shown in FIG. 2 has a primary direction of deformation, which in FIG. 2 is illustrated via a double arrow shown on the battery cells 10 of the cell stack 20. The primary direction of deformation of the battery cell stack 20 is parallel to the stacking direction of the battery cells 10, which is due to the fact that the battery cells 10 swell respectively when they are charged and/or discharged, causing the flat side surfaces of the battery cells 10 to be pushed outwardly. Thus, the battery cell stack 20 expands and swells most along the illustrated primary direction of deformation.

However, when the battery cell stack 20 expands and swells, also the flexible CCU 140 is reversibly extended and enlarged, as the elastic material therein is adapted to reversibly deform which allows for the CCU 140 to reversibly adjust to the deformation of the cell stack 20. If in this scenario, the first flexible bracket 145 would be a solely rigid and stiff component, the first flexible bracket 145 would burst and/or rupture, thereby releasing the PCB 150 and breaking the battery system 300.

However, as according to the invention, the first flexible bracket 145 comprises an elastic and flexible material, and as the geometry and orientation of the first flexible bracket 145 relative to the PCB 150 is chosen as described hereinbefore, the first flexible bracket 145 allows to reversibly compensate for the arising change in the position and length of the CCU 140 relative to the PCB 150, the arising change being due to a reversible deformation of the CCU 140. Thus, the first flexible bracket 145 is adapted to compensate for an arising change in the length ratio of the lengths of the CCU 140 and of the PCB 150.

Due to the elastic material, the cuboid geometry and the orientation of the first flexible bracket 145 relative to the primary direction of deformation of the battery cell stack 20 and the CCU 140, the stiffness of the first flexible bracket 145 is smallest in a direction which is parallel to the primary direction of deformation of the cell stack 20, causing the first flexible bracket 145 to be most flexible along the primary direction of deformation. In FIG. 2, this flexibility is schematically indicated via a line and a double arrow being shown on the first flexible bracket 145 and the PCB 150.

However, in a direction which is perpendicular to the primary direction of deformation and parallel to the first quadrilateral faces of the first flexible bracket 145, the first flexible bracket 145 has a stiffness sufficient to fix the PCB 150 to the CCU 140 in this direction.

Figure 3:
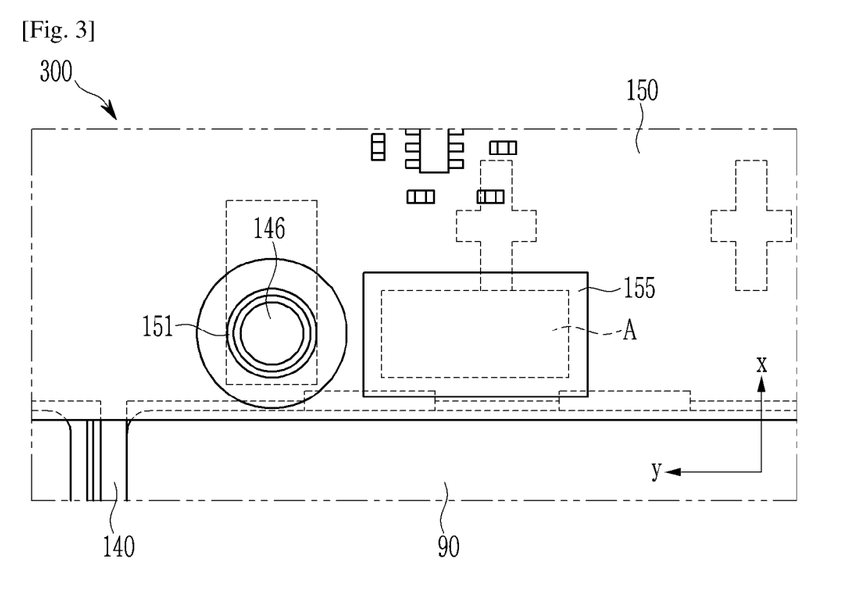
FIG. 3 illustrates a schematic top view onto the detail of the battery system as shown in FIG. 1.

In FIG. 3, it is illustrated a schematic top view onto the detail of the battery system 300 as shown in FIG. 1. Furthermore, a coordinate system is shown in FIG. 3, with an x-axis pointing in a direction which is perpendicular to the primary direction of deformation of the battery cell stack 20 and parallel to the PCB 150 and a y-axis that is pointing in a direction which is parallel to the primary direction of deformation of the battery cell stack 20.

In the y-direction, the first flexible bracket 145 being realized as a length compensating bracket has a by far smaller stiffness when compared to its stiffness in the x-direction. This allows for the first flexible bracket 145 to compensate for changes in the length-difference between the PCB 150 and the CCU 140 which arises due to a swelling of the battery cell stack 20 when in use. In the x-direction, the first flexible bracket 145 is stiff enough to fix the PCB 150 to the CCU 140, which is due to the geometry of the first flexible bracket 145 and the elastic and flexible materials coming to use.

Expressed in other words, the cell connecting bus bars or the battery cell connectors 90 of the battery system 300 are molded into the CCU 140. The material of the CCU 140 is flexible enough to expand in case of a swelling of the battery cells 10 of the battery cell stack 20. The CCU 140 further has two different mounting brackets 145, 148, allowing for the PCB 150 to be mounted to the battery system 300. One mounting bracket 145 is provided with a hot staking dome to fix the PCB 150 at the CCU 140. This bracket 145 is designed to balance the swelling expansion between the CCU 140 and the PCB 150.

For the bonding process, the area of the bonding pad 155 has to be supported very well. Therefore, every bonding pad 155 of the PCB 150 is supported by an additional bracket 148 and a mounting bracket 145 positioned next to it in order to avoid a gap between the PCB 150 and the supporting bracket 148.

The invention claimed is:

1. A battery system, comprising:
a cell stack comprising a plurality of battery cells, wherein at least two battery cells of the cell stack are electrically interconnected via a battery cell connector;
a battery management system comprising a printed circuit board (PCB); and
a cell connecting unit (CCU), wherein the battery cell connector is accommodated in the CCU, the CCU being fixed onto the cell stack and comprising at least one first flexible bracket that is inserted into a corresponding mounting hole of the PCB,
characterized in that the first flexible bracket of the CCU comprises a member configured to fix the PCB to the CCU after the member has been molten in a state in which the first flexible bracket was inserted into the corresponding mounting hole.

2. The battery system of claim 1, wherein the battery cell connector is realized as a bus bar that is molded into the CCU.

3. The battery system of claim 1, wherein the member of the first flexible bracket is adapted to be molten via a hot staking procedure.

4. The battery system of claim 1, wherein the CCU comprises an elastic material which is adapted to reversibly deform, allowing for the CCU to reversibly adjust to a deformation of the cell stack that is due to a charging or a discharging of at least one battery cell of the cell stack.

5. The battery system of claim 4, wherein the first flexible bracket comprises an elastic material which is adapted to reversibly deform, allowing for the first flexible bracket to reversibly compensate for an arising change in the position of the PCB relative to the CCU due to a reversible deformation of the CCU.

6. The battery system of claim 1, wherein the CCU has a substantially plate shaped body portion, wherein the first flexible bracket comprises a base part and wherein the member protrudes from the base part.

7. The battery system of claim 6, wherein the base part has the shape of a cuboid, wherein at least one edge of the cuboid extends into a direction which is perpendicular to the substantially plate shaped body portion of the CCU and wherein the member has the shape of a cylinder which protrudes from the base part into a direction that is parallel to the at least one edge of the cuboid, forming a prolongation of the cuboid shaped base part.

8. The battery system of claim 1, wherein the cell stack has a primary direction of deformation along which it deforms most during a charge and/or a discharge of at least one of the battery cells of the cell stack, wherein the stiffness of the first flexible bracket is smallest in a direction which is parallel to the primary direction of deformation.

9. The battery system of claim 7, wherein the base part of the first flexible bracket has two opposing first quadrilateral faces and two opposing second quadrilateral faces, wherein the first and second quadrilateral faces are arranged substantially perpendicularly to the substantially plate shaped body portion of the CCU, and wherein the first quadrilateral faces each have an area that is larger than the area of one of the second quadrilateral faces respectively, the second quadrilateral faces extending along a direction that is parallel to the primary direction of deformation of the cell stack.

10. The battery system of claim 9, wherein the PCB comprises at least one bonding pad and wherein the CCU comprises a second bracket, adapted to physically support the bonding pad.

11. The battery system of claim 10, wherein in a fully assembled state of the battery system, a first surface of the PCB faces towards the CCU and a second surface of the PCB faces away from the CCU, wherein the bonding pad is arranged on the second surface of the PCB and wherein the second bracket extends from the CCU towards an area (A) of the first surface directly opposing the bonding pad.

12. The battery system of claim 10, wherein in a fully assembled state of the battery system, the second bracket contacts the PCB to support the bonding pad.

13. The battery system of claim 10, wherein the first flexible bracket and the second bracket are positioned next to each other.

14. The battery system of claim 10, wherein the second bracket has the shape of a cuboid, wherein one surface of the cuboid at least in part is in contact with the PCB.

15. The battery system of claim 10, wherein the second bracket has two opposing first quadrilateral faces and two opposing second quadrilateral faces,
wherein the first and second quadrilateral faces are arranged substantially perpendicularly to the substantially plate shaped body portion of the CCU, and
wherein the first quadrilateral faces each have a surface area that is larger than the surface area of one of the second quadrilateral faces respectively, wherein the first quadrilateral faces of the second bracket extend in a plane that is parallel to the second quadrilateral faces of the first flexible bracket respectively.

* * * * *